Nov. 18, 1969    R. L. VOTAW ET AL    3,478,409
METHOD AND APPARATUS FOR COATING FASTENER HOLES
Filed May 16, 1966
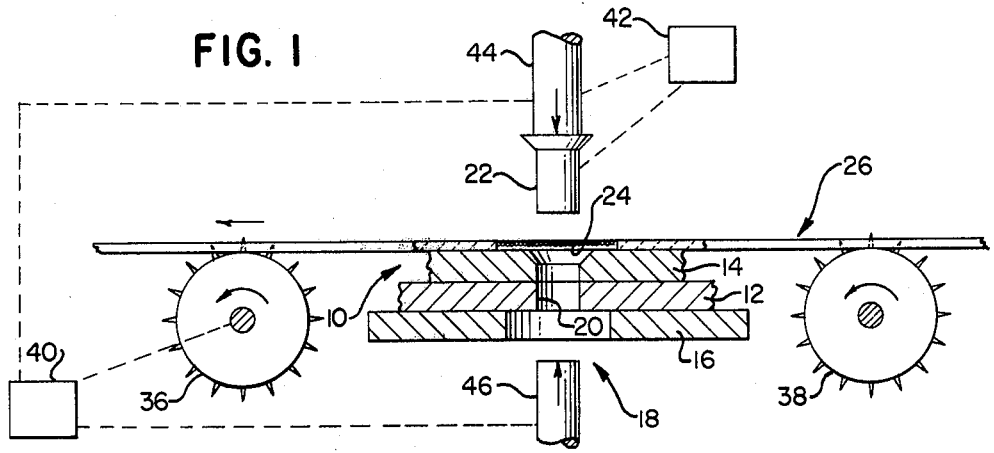
FIG. 1
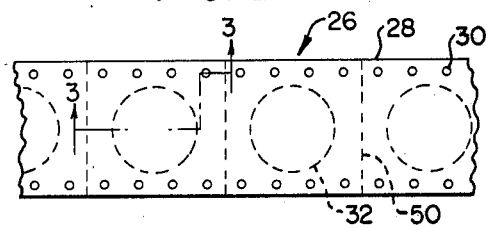
FIG. 2
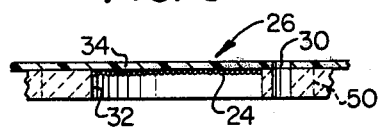
FIG. 3
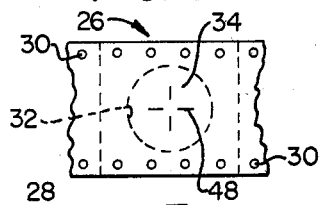
FIG. 6
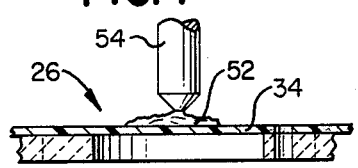
FIG. 7
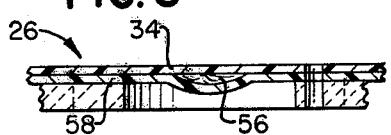
FIG. 8
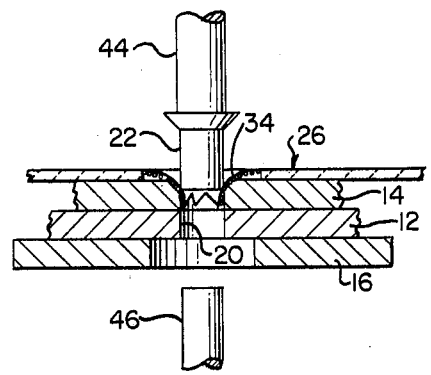
FIG. 4
FIG. 5
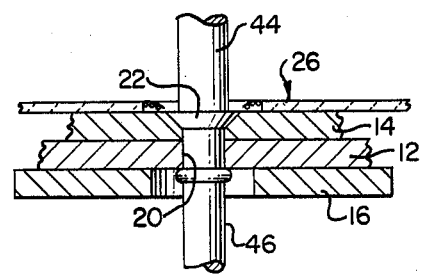
INVENTORS
RICHARD L. VOTAW &
JOHN E. KLINE
BY
THEIR ATTORNEYS United States Patent Office 3,478,409
Patented Nov. 18, 1969

3,478,409
METHOD AND APPARATUS FOR COATING FASTENER HOLES
Richard L. Votaw and John E. Kline, Dayton, Ohio, assignors to The National Cash Register Company, Dayton, Ohio, a corporation of Maryland
Filed May 16, 1966, Ser. No. 550,218
Int. Cl. B23p 3/00, 25/00
U.S. Cl. 29—458                     3 Claims

ABSTRACT OF THE DISCLOSURE

A method and apparatus for coating fastener holes, which method and apparatus are especially adaptable for use with automatic fastener machines. The coating material to be applied to a hole is carried on a rupturable member of a carrier means, which carrier means is positioned between the hole to be coated and the fastener to be inserted therein. The fastener is moved through the rupturable member into the fastener hole and moves at least a portion of the coating material into the hole to coat it when the fastener is secured in the hole.

---

This invention relates to a method and apparatus for coating selected areas of a workpiece, and more particularly it relates to the method and apparatus for coating fastener holes, which method and apparatus are especially adaptable for use with automatic fastener insertion machines.

There are apparently two general approaches to solving the problem of providing a coating between a fastener, such as a screw or a rivet, and a fastener hole in a manufactured article such as two metal pieces which are joined by the fastener. One approach is to provide the fastener with the coating, and the fastener and the coating combined are inserted into the fastener hole; the specific coating used would naturally depend upon its intended purpose, which may be for corrosion protection, sealing, insulation, adhesion, etc. A second approach would be to coat the fastener hole itself and then insert the fastener into the coated hole.

In both of the above general approaches, there are disadvantages. When the fastener itself receives the coating, it becomes messy to handle, the coating may come off during normal handling of the fastener, and the fastener with the coating thereon is difficult to feed, especially with automatic fastener insertion machines. When the fastener hole is coated, expensive spray or coating equipment is frequently needed.

In contrast with the preceding two general approaches, applicants' method of coating a fastener hole utilizes a novel coating carrier means which is independent of both the fastener itself and the fastener hole. Applicants' method generally comprises the steps of securing the coating material to a membrane area of a carrier means and then indexing the carrier means so that the coating material carried thereon is positioned adjacent to the fastener hole to be coated. The fastener to be inserted into the fastener hole is then utilized to force coating material carried on the membrane area against that portion of the hole which is to be coated, and the fastener is then secured in the fastener hole to coat the faying or abutting surfaces of the fastener and the fastener hole. That portion of the membrane area which is secured in the fastener hole along with the secured fastener is then separated from the carrier means.

Accordingly, the objects of this invention are:
(a) To provide a method and an apparatus for coating fastener holes which are economical, easily adaptable for use with a variety of fasteners, and easily adaptable for use with a variety of coating materials;
(b) To provide a method and an apparatus for use with automatic fastener insertion machines for coating the joining surfaces between a fastener and a fastener hole.

These and other objects and advantages will become more readily understood in connection with the accompanying drawing, in which:

FIG. 1 is a side view in elevation and partly in cross section showing the carrier means having the coating material thereon and also showing the step of positioning the coating material over the fastener hole to which the coating material will be applied;

FIG. 2 is a plan view of one embodiment of the carrier means to which the coating is secured;

FIG. 3 is an enlarged cross sectional view of the carrier means shown in FIG. 2 and is taken along the line 3—3 of FIG. 2;

FIG. 4 is a side view similar to FIG. 1 and shows the fastener (a rivet) being driven through a rupturable member on the carrier means to move the coating material into engagement with the fastener hole;

FIG. 5 is a side view similar to FIG. 4 and shows one end of the fastener (a rivet) upset to secure the two metal plates together and also shows the coating material and a portion of the rupturable membrane of the carrier means trapped under the head of the fastener and forced between the shank of the fastener and the fastener hole;

FIG. 6 is a plan view of another modification of the carrier means of this invention, which modification utilizes perforations in the rupturable member of the carrier means so as to provide predictable tear portions;

FIG. 7 is a diagrammatic view similar to FIG. 3, but it shows a method of applying coating material to another embodiment of the carrier means; and FIG. 8 is a cross sectional view similar to that shown in FIG. 3, but it shows another ewbodiment of the carrier means in which the coating material is secured thereto between membranes.

FIG. 1 shows somewhat schematically the method and the apparatus used in this invention to coat a fastener hole in a workpiece. The workpiece 10 illustrated consists of two metal plates 12 and 14, which are supported on a work bed 16, which is part of an automatic fastener insertion machine designated generally as 18 and shown only schematically for ease of illustration, since the invention may be used with any machine of known variety.

The workpiece 10 is provided with a fastener hole 20, which is shaped to receive a fastener 22, which is shown as a rivet. It is the hole 20 which has the faying or abutting surfaces therein to be coated with coating material. The type of coating to be applied to the fastener hole 20 is naturally dependent upon its intended purpose, which may be corrosion protection, sealing, insulation, adhesion, etc. The mass of coating material 24 illustrated in the embodiment shown in FIG. 1 is made of microscopically small capsules which rupture when subjected to a predetermined pressure to release the coating material contained therein and they coat the fastener hole 20 and the fastener there in.

The mass of coating material 24 is carried by the carrier means designated generally as 26 and shown in FIGS. 1 to 5 inclusive. The carrier 26 includes a tape 28, which is provided along its lateral edges with equally-spaced driving holes 30, which receive the tines of a driving sprocket. The tape 28 is also provided with a plurality of equally-spaced openings 32, which are covered by a membrane 34, to which the coating material 24 is secured, as shown particularly in FIG. 3; the nature of the coatings will be described later.

The carrier 26, when in use, is supported on pairs of sprocket wheels such as 36 and 38, which are rotatably mounted in the framework of the fastener insertion machine 18. The sprocket wheel 36 is intermittently driven by suitable driving means shown diagrammatically as 40, and the driving means 40 is effective to drive and position the carrier means 26 (which is fed from a feed roll not shown) so that the coating material 24 carried thereby is placed in juxtaposition relative to the fastener hole 20 to facilitate the transfer of the coating material therein.

The fastener insertion machine 18 also includes suitable fastener delivery means 42 (shown diagrammatically), which means is effective to position the fastener, a rivet 22, to be pushed into the fastener hole 20 by the ram 44, which is operatively connected to the driving means 40.

As the ram descends (as viewed in FIGS. 1, 4 and 5), the rivet 22 is carried downwardly and punctures the membrane 34 (FIG. 4) to force portions of the membrane 34 and the coating material 24 carried thereby into engagement with the faying surfaces of the fastener hole 20.

FIG. 5 shows the rivet 22 in position in the fastener hole 20 after having the shank end of the rivet upset by suitable hammer means 46 to secure the two metal plates 12 and 14 together. In this secured condition, the coating material 24 is trapped under the head of the rivet and isis forced along its sides to provide a coating between the faying or abutting surfaces of the rivet 22 and the fastener hole 20. The hammer 46 shown in FIG. 5 is operatively connected to the driving means 40.

The driving means 40 is effective to cycle the fastening operation so that the carrier 26 will be in position and stationary when the ram 44 pushes the rivet 22 downwardly to seat the rivet 22 in the fastener hole 20. After the rivet is in position in the hole and backed up by the ram 44, the driving means 40 actuates the hammer 46 to upset the shank portion of the rivet 22.

As previously mentioned, the specific coating selected for use with the carrier 26 is dependent upon the particular purpose for which the coating is used. One of the important coatings to be used in the present invention is a liquid anti-corrosion sealant which is used for fastening together overlapping metal plates such as 12 and 14 shown in FIG. 1. This liquid when used with aluminum plates, for example, may be a zinc yellow dispersed in an oily evaporable material such as toluene or xylene, with or without supplementary ingredients.

The particular techniques for encapsulating different coating matrials in micro-sized capsules do not form a part of this invention, and any suitable technique may be used. Some techniques which are suitable are disclosed in the following United States patents: Nos. 2,800,458; 2,969,330; 2,969,331; 3,041,289; and 3,190,837.

The micro-sized capsules which contain the coating material may have a size ranging from one or two microns up to several hundred microns in greatest dimension. The size of the capsule selected is determined by the specific coating material used and also by the tolerances between the fastener, such as the rivet 22, and the fastener hole 20 shown in FIG. 1. The contents of the capsule can be solid, liquid, or powder and be as much as 90% of the entire weight of the capsule, which leaves about 10% for the weight of the capsular wall material. This leaves very little ruptured-capsular-wall debris between fastener and fastener hole after the capsules are broken in use. The walls of the capsules are sufficiently strong to withstand normal handling without being ruptured, but are adaptable to rupture when subjected to the pressures exerted on the capsules when the fastener is secured in its fastener hole. The carrier 26 with the capsules secured thereto provides a dry tape construction which is especially advantageous when liquid coating materials are being handled.

The coating material 24 shown most clearly in FIG. 3 consists of a plurality of capsules which are adhesively secured to one side of the membrane 34, which may be made of a suitable plastic such as Mylar. A suitable adhesive is first applied to the surface of the membrane 34, and the capsules (shown as the coating 24 in FIG. 3) are dusted onto the adhesive (not shown) to secure the capsules to the membrane 34. The tape 28 portion of the carrier is sufficiently thick to provide protection for the coating 24 in the opening 32 as the carrier 26 slides over a workpiece 10, as shown in FIG. 1. After the adhesive dries and the capsules are secured to the membrane 34, the carrier 26 can be conveniently rolled up into a feed roll (not shown) until it is ready for use.

Different feed rolls may be stored, each feed roll having a different coating material 24 contained thereon. By this technique, a variety of coatings may be used with a variety of different fasteners such as rivets, nails, screws, and the like, as the casting material 24 is not associated with either the fastener or the fastener hole until the fastening operation is effected.

To facilitate the fastening operation and to provide for a more even distribution of the coating material 24 in the fastener hole, the membrane 34 may be provided with perforations or score lines 48 (FIG. 6), which give an even, predictable tear when the rivet 22 passes therethrough on its way to the fastener hole 20, as shown in FIG. 4. The carrier 26 may also be provided with transverse cut lines 50 (FIG. 2), which facilitate the separation of used portions of the carrier 26 from the unused portions.

The carrier 26 may also be provided with a coating material 52, which is dropped onto the membrane 34 by an applicator gun 54, as shown in FIG. 7. The coating material 52 deposited by this technique may be paint, waxes, paraffins, globs of micho-capsules, and the like. If it is more advantageous for the particular application of the coating to have the coating material 52 next to the fastener hole in the arrangement shown in FIG. 1, a simple suitable tape-inverting means (not shown) can be used to invert the carrier 26, so that coating material will be on the under side of the carrier instead of on its top, as shown in FIG. 7.

Another modification of the carrier 26 is shown in FIG. 8, in which the coating material 56 is maintained in position between the membrane 34 and a membrane 58, which is a protective layer of plastic material such as Mylar and which may be about five thousandths of an inch thick. When the carrier 26 is positioned next to the fastener hole for the fastening operation, the fastener breaks through the membranes 34 and 58, and the coating material 56 is released to coat the abutting surfaces of the fastener and the fastener hole as previously explained.

What is claimed is:

1. For use with an apparatus for automatically inserting a fastener into a hole in a workpiece, the method of coating at least one faying surface in said hole comprising the steps of:

securing a mass of coating material to a carrier means having equally-spaced rupturable areas thereon so that a discrete amount of said coating material is secured to each said rupturable area;

indexing said carrier means of the previous step so as to position one of said areas at a fastening station in said apparatus whereby the discrete amount on said one of said areas is positioned between said hole in the workpiece and the fastener to be inserted therein, and whereby said carrier means remains unattached to said workpiece;

moving said fastener through both said last-named area and discrete amount into said hole to move at least a portion thereof into the said hole;

securing said fastener in said hole to thereby trap said portion in said hole to coat said faying surface;

and separating said portion of the previous step from the remainder of said carrier means.

2. The method as claimed in claim 1 in which said mass of coating material comprises a plurality of pressure-activatable capsules which have a size ranging from about one micron to several hundred microns in largest dimension and which contain coating matter; said last-named step of securing being effective to actuate said capsules to release said coating material to coat said faying surface.

3. A tape construction for use with an automatic fastener insertion machine having a plunger means adapted to force a fastener into a fastener hole in a workpiece and to secure it therein, said tape constrution comprising:
   carrier means having a plurality of openings spaced along th the length thereof;
   a rupturable membrane member secured to said carrier means to cover each said opening, with said membrane member having perforations therein at each said opening to facilitate the rupture thereof along predetermined lines; and
   a mass of coating material secured to said membrane member at each said opening in said carrier means;
   said carrier means having equally-spaced driving holes along the lateral edges thereof for use in indexing a mass of coating material on said carrier means to a fastener hole so as to position said mass between a fastener hole and said plunger means;
   said membrane member being adapted to rupture along said predetermined lines to facilitate the entry of said coating material into said fastener hole when said plunger means forces a fastener associated therewith into said fastener hole.

References Cited

UNITED STATES PATENTS

| 2,666,354 | 1/1954 | Dim et al. | |
|---|---|---|---|
| 2,697,873 | 12/1954 | Cooke. | |
| 2,860,081 | 11/1958 | Eiken | 161—113 |
| 2,940,884 | 6/1960 | White | 161—113 XR |
| 2,955,351 | 10/1960 | McCreadie | 156—92 XR |
| 2,980,941 | 4/1961 | Miller | 161—162 XR |
| 2,986,477 | 5/1961 | Eichel | 117—122 |
| 2,998,777 | 9/1961 | Ryan. | |
| 3,351,421 | 11/1967 | Boggs et al. | 29—460 XR |

HAROLD ANSHER, Primary Examiner

G. W. MOXON II, Assistant Examiner

U.S. Cl. X.R.

29—526; 156—91, 92; 161—53, 112